(12) United States Patent
Murayama (10) Patent No.: US 10,717,842 B2
(45) Date of Patent: Jul. 21, 2020

(54) SPONGE ROLLER AND IMAGE-FORMING APPARATUS

(71) Applicant: Shin-Etsu Polymer Co., Ltd., Tokyo (JP)

(72) Inventor: Sadao Murayama, Kamikawa-cho (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 0 days.

(21) Appl. No.: 15/753,595

(22) PCT Filed: Nov. 2, 2016

(86) PCT No.: PCT/JP2016/082715
§ 371 (c)(1),
(2) Date: Feb. 20, 2018

(87) PCT Pub. No.: WO2017/078113
PCT Pub. Date: May 11, 2017

(65) Prior Publication Data
US 2019/0040222 A1 Feb. 7, 2019

(30) Foreign Application Priority Data

Nov. 4, 2015 (JP) .................................. 2015-216832

(51) Int. Cl.
| | |
|---|---|
| *C08J 9/32* | (2006.01) |
| *F16C 13/00* | (2006.01) |
| *C08J 9/06* | (2006.01) |
| *G03G 15/16* | (2006.01) |
| *G03G 21/00* | (2006.01) |

(Continued)

(52) U.S. Cl.
CPC . *C08J 9/32* (2013.01); *C08J 9/06* (2013.01); *C08J 9/102* (2013.01); *F16C 13/00* (2013.01); *G03G 15/0233* (2013.01); *G03G 15/0818* (2013.01); *G03G 15/162* (2013.01); *G03G 15/168* (2013.01); *G03G 15/206* (2013.01); *G03G 15/2057* (2013.01); *G03G 15/2064* (2013.01); *G03G 21/0058* (2013.01); *C08J 2203/04* (2013.01); *C08J 2203/22* (2013.01);
(Continued)

(58) Field of Classification Search
None
See application file for complete search history.

(56) References Cited

U.S. PATENT DOCUMENTS

| | | | |
|---|---|---|---|
| 4,756,065 A | 7/1988 | Carlson | |
| 6,300,384 B1 * | 10/2001 | Baba | C08J 9/10 521/134 |

(Continued)

FOREIGN PATENT DOCUMENTS

| | | |
|---|---|---|
| JP | 200164434 A | 3/2001 |
| JP | 200524902 A | 1/2005 |

(Continued)

*Primary Examiner* — Chinessa T. Golden
(74) *Attorney, Agent, or Firm* — The Webb Law Firm (57) ABSTRACT

The present invention provides a sponge roller comprising a shaft body and an elastic layer formed on an outer peripheral surface of the shaft body, wherein the elastic layer is formed of a millable silicone rubber, unexpanded microballoon cells and chemical blowing agent cells, and an image forming apparatus comprising the sponge roller. The sponge roller has high durability, excellent surface smoothness and small permanent compression set.

6 Claims, 3 Drawing Sheets

(51) Int. Cl.
*G03G 15/20* (2006.01)
*G03G 15/02* (2006.01)
*G03G 15/08* (2006.01)
*C08J 9/10* (2006.01)

(52) U.S. Cl.
CPC ...... *C08J 2205/044* (2013.01); *C08J 2383/04* (2013.01)

(56) References Cited

U.S. PATENT DOCUMENTS

| | | |
|---|---|---|
| 6,451,866 B1 | 9/2002 | Kanai et al. |
| 9,260,606 B2 | 2/2016 | Nakajima et al. |
| 2008/0025771 A1* | 1/2008 | Ogawa ............... G03G 15/2014 |

FOREIGN PATENT DOCUMENTS

| | | |
|---|---|---|
| JP | 3647110 B2 | 5/2005 |
| JP | 3658305 B2 | 6/2005 |
| JP | 1638714 B2 | 2/2011 |
| JP | 2014112172 A | 6/2014 |
| WO | 2013005613 A1 | 1/2013 |

* cited by examiner

SPONGE ROLLER AND IMAGE-FORMING APPARATUS

CROSS-REFERENCE TO RELATED APPLICATIONS

This application is the United States national phase of International Application No. PCT/JP2016/082715 filed Nov. 2, 2016, and claims priority to Japanese Patent Application No. 2015-216832 filed Nov. 4, 2015, the disclosures of which are hereby incorporated in their entirety by reference.

TECHNICAL FIELD

The present invention relates to a sponge roller and an image forming apparatus. More particularly, the present invention relates to a sponge roller having high durability, excellent surface smoothness and small permanent compression set, and an image forming apparatus comprising the sponge roller.

BACKGROUND ART

A rubber sponge having porous structure is suitably used for, for example, various rollers for an image forming apparatus, a sponge for washing, a sponge for absorbing fluids such as water, oil and the like, a material for stamp, and the like.

Such rubber sponges can be produced, for example, by a foam molding method using a blowing agent, a method using hollow microparticles or the like, an elution method to elute soluble particles mixed in advance, or the like. For example, as a "method for forming a conductive compressible layer 23" of an image transfer roll for an image forming apparatus, Patent Literature 1 discloses "A foam molding method in which a blowing agent is compounded in a synthetic rubber formulation to form a compressible layer, and the blowing agent foams during rubber vulcanization to form a compressible layer having cells; a hollow microparticle mixing method in which hollow microparticles are compounded in place of a blowing agent, and independent cells are formed; or a powder elution method in which powders soluble in an elution liquid such as water, methanol, etc., for example, sodium chloride, sugar and the like, are compounded in a synthetic rubber formulation, and the powders are eluted after rubber vulcanization to form a compressible layer having cells; and the like are known."

More specifically, as a method using microballoons, Patent Literature 2 discloses "A pressure roller having an elastic layer dispersedly containing cavity portions formed by resin microballoons around a core metal, wherein the elastic layer is formed by heating a liquid silicone rubber containing expanded resin microballoons on the core metal at a temperature lower than the softening point of the resin microballoons to cure the liquid silicone rubber, and then breaking the resin microballoons to form the cavity portions" (claim 1, etc.).

In addition, Patent Literature 3 discloses "A substantially closed cell type silicone elastomer porous body, which can be used for image forming components such as a copying machine, a laser printer, or the like by using a water-in-oil type emulsion composition capable of producing a silicone elastomer porous body having uniform fine cells (bubbles) without a foaming phenomenon".

In addition to various types of rollers for image forming apparatuses, Patent Literature 4 relating to "sponge rubber print body" as a material for stamp, discloses "A sponge rubber print body having open cells obtained by kneading rubber, water soluble fine powders, a vulcanizing agent, a filler and a staple of organic synthetic fibers of a fiber length of 0.2 to 2 mm to prepare a master batch, and then vulcanizing the mixture and washing out the water soluble fine powders" (Claim 1).

Patent Literature 5 discloses a silicone rubber sponge produced by mixing expanded resin microballoons with a low molecular weight silicone rubber to prepare a compound A, mixing a high molecular weight silicone rubber with the compound A to prepare a silicone rubber compound, and heating the silicone rubber compound at a temperature lower than a softening point of the resin microballoons to cure the silicone rubber (see claim 1).

CITATION LIST

Patent Literature

Patent Literature 1: JP 2005-24902
Patent Literature 2: JP 3658305
Patent Literature 3: JP 4638714
Patent Literature 4: JP 3647110
Patent Literature 5: WO 2013/005613

SUMMARY OF THE INVENTION

Technical Problem

An object of the present invention is to provide a sponge roller having high durability and excellent surface smoothness and excellent permanent compression set, and an image forming apparatus comprising the sponge roller.

Solution to the Problem

Means to solve the above problems are the following (1) to (6).

(1) A sponge roller comprising a shaft body and an elastic layer formed on an outer peripheral surface of the shaft body,
wherein the elastic layer is formed of a millable silicone rubber, unexpanded microballoon cells and chemical blowing agent cells.

(2) The sponge roller according to (1), comprising a shaft body and an elastic layer formed on an outer peripheral surface of the shaft body,
wherein a cell area ratio of the unexpanded microballoon cells and the chemical blowing agent cells on a cross section of the elastic layer is 95:5 to 50:50.

(3) The sponge roller according to (1) or (2), wherein a specific gravity of the elastic layer is 0.9 to 0.3.

(4) The sponge roller according to any one of (1) to (3), wherein the elastic layer has composite cells formed of the unexpanded microballoon cells having an average cell diameter of 150 μm or less and the chemical blowing agent cells having an average cell diameter of 300 μm or less.

(5) The sponge roller according to any one of (1) to (4), wherein 25% permanent compression set of the elastic layer is 15% or less, and a hardness decrease in 25% compression durability test of the elastic layer is 15% or less.

(6) An image forming apparatus comprising the sponge roller according to any one of (1) to (5).

Advantageous Effects of the Invention

In the present invention, the elastic layer is formed of a millable silicone rubber and unexpanded microballoon cells and chemical blowing agent cells. Therefore, the present invention can provide an excellent sponge roller which can manage both of surface smoothness of small diameter cells by the microballoons and characteristics of large diameter cells by the chemical blowing agent.

In the present invention, a cell area ratio of the unexpanded microballoon cells and the chemical blowing agent cells on a cross section of the elastic layer is 95:5 to 50:50. Therefore, the present invention can provide an excellent sponge roller which can manage both of surface smoothness of small diameter cells by the microballoons and characteristics of large diameter cells by the chemical blowing agent.

In the present invention, the elastic layer has both of the unexpanded microballoon cells having an average cell diameter of 150 μm or less and the chemical blowing agent cells having an average cell diameter of 300 μm or less. Therefore, the present invention can provide a sponge roller which has small permanent compression set, small hardness decrease in repeated compression, and excellent surface smoothness, and is capable of forming a high quality image when used in an image forming apparatus.

The present invention can provide an image forming apparatus having good image quality by adopting and incorporating the sponge roller according to the present invention.

DESCRIPTION OF THE INVENTION

Figure 1:
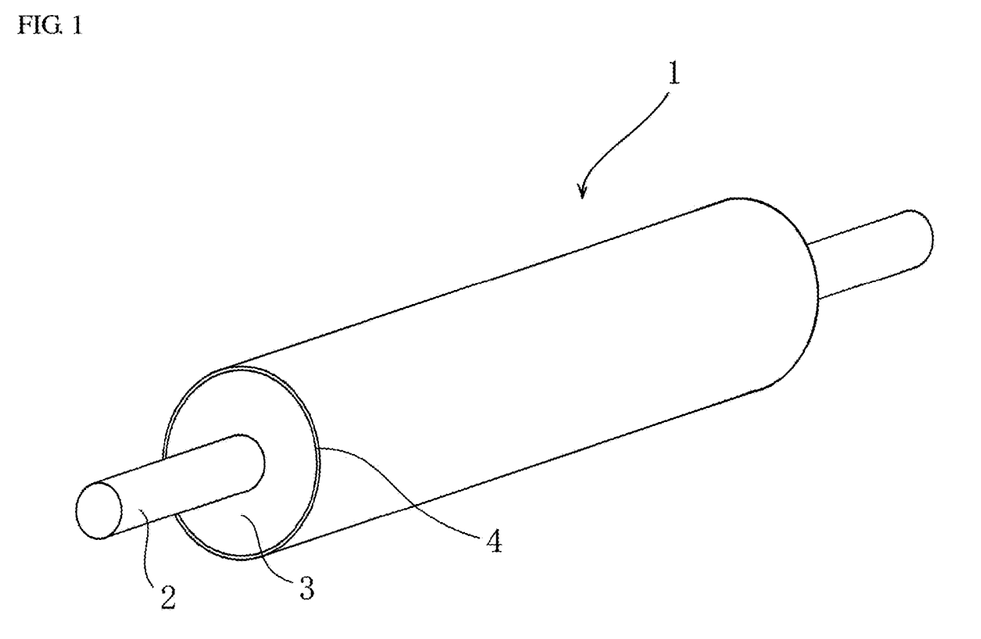
FIG. 1 is an explanatory drawing showing a sponge roller of an embodiment of the present invention.

As shown in FIG. 1, the sponge roller 1 of an embodiment of the present invention comprises a shaft body 2 which is also called a core metal, and an elastic layer 3 formed on the outer peripheral surface of the shaft body. 4 is a fluororesin layer formed on the surface of the elastic layer 3.

The shaft body is an elongated cylindrical body called a core metal formed of usually iron, aluminum, stainless steel, brass or the like. The shaft body is adjusted to an appropriate diameter and length in the axial direction according to the image forming apparatus to be mounted.

When a sponge roller is incorporated in the image forming apparatus, this shaft body has usually a diameter of 5.0 to 40 mm, and the axial length from one end to the other end is usually 150 to 1000 mm.

The elastic layer is formed of a millable silicone rubber, unexpanded microballoons and a chemical blowing agent.

The millable silicone rubber is a silicone rubber compound wherein the state of the silicone rubber compound before curing is similar to that of unvulcanized compounded rubber of natural rubber or ordinary synthetic rubber, and the silicone rubber compound can be plasticized and mixed by a kneading roll machine or a closed type mixing machine or the like.

A preferable millable silicone rubber comprises:
(A) an organopolysiloxane having a polymerization degree of 100 or more, represented by the following average composition formula (I)

$$R^1_a SiO_{(4-a)/2} \tag{I}$$

wherein $R^1$ is the same or different and is an unsubstituted or substituted monovalent hydrocarbon group, and a is a positive number of 1.95 to 2.05;
(B) a reinforcing silica having a specific surface area of 50 m²/g or more as measured by a BET adsorption method;
(C) an alkoxysilane represented by the following formula (II)

$$R^2_m Si(OR^3)_{4-m} \tag{II}$$

wherein $R^2$ is independently hydrogen atom or an unsubstituted or substituted monovalent hydrocarbon group, $R^3$ is the same or different and is an unsubstituted or substituted alkyl group, and m is 0, 1, 2 or 3;
(D) water; and
(E) a hexaorganodisilazane represented by the following formula (III)

$$R^4_3 SiNHSiR^4_3 \tag{III}$$

wherein $R^4$ is the same or different and is a monovalent hydrocarbon group.

$R^1$ in the formula (I) representing the organopolysiloxane is preferably a monovalent hydrocarbon group having 1 or 12 carbon atoms, particularly preferably 1 to 8 carbon atoms. Specific examples thereof include a alkyl group such as methyl group, ethyl group, propyl group, butyl group, hexyl group, octyl group or the like, a cycloalkyl group such as cyclopentyl group, cyclohexyl group or the like, an alkenyl group such as vinyl group, allyl group, propenyl group or the like, a cycloalkenyl group, an aryl group such as phenyl group, tolyl group or the like, an aralkyl group such as benzyl group, 2-phenylethyl group or the like, or these groups a part or all of the hydrogen atoms of which are substituted with a halogen atom such as fluorine, chlorine and the like or cyano group or the like, for example, chloromethyl group, trifluoropropyl group, cyanoethyl group or the like. Methyl group, vinyl group, phenyl group and trifluoropropyl group are preferable, and methyl group and vinyl group are particularly preferable.

In particular, an organopolysiloxane as the component (A) is preferably an organopolysiloxane having in a molecule 2 or more, usually 2 to 50, particularly 2 to about 20 aliphatic unsaturated groups such as alkenyl groups, cycloalkenyl groups or the like, particularly preferably vinyl groups. In this case, it is preferable that $R^1$ in an amount of 0.01 to 20 mol %, particularly 0.02 to 10 mol % of all $R^1$ is an aliphatic unsaturated group. Incidentally, the aliphatic unsaturated group may be bonded to a silicon atom at the end of the molecular chain, or may be bonded to a silicon atom in the middle of the molecular chain (non-terminal of the molecular chain), or may be bonded to both of them, but preferably is bonded to at least a silicon atom at the end of the molecular chain.

In addition, a is a positive number of 1.95 to 2.05, preferably 1.98 to 2.02, more preferably 1.99 to 2.01. Also, it is desirable that $R^1$ in an amount of 90 mol % or more, preferably 95 mol % or more of all $R^1$ is an alkyl group, particularly methyl group; and further preferably all $R^1$ except for an aliphatic unsaturated group is an alkyl group, particularly a methyl group.

Molecular structure of the organopolysiloxane of the component (A) is preferably a straight chain or straight chain having a partially branched structure. Specifically, the repeating structure of the diorganosiloxane unit ($R^1_2SiO_{2/2}$ wherein $R^1$ is the same as described above, and the same applies in the following) constituting the main chain of the organopolysiloxane is preferably one consisting of only the repeating structure of dimethylsiloxane unit, or one consisting of the repeating structure of dimethylsiloxane unit of this main chain, to which is introduced as a part of the dimethylsiloxane structure, a diorganosiloxane unit such as diphenylsiloxane unit, methylphenylsiloxane unit, methylvinylsiloxane unit, methyl-3,3,3-trifluoropropylsiloxane unit and the like, which has phenyl group, vinyl group, 3,3,3-trifluoropropyl group or the like as a substituent.

It is preferable that both ends of the molecular chain are blocked, for example, by a triorganosiloxy group ($R^1_3SiO_{1/2}$) such as trimethylsiloxy group, dimethylphenylsiloxy group, vinyldimethylsiloxy group, divinylmethylsiloxy group, trivinylsiloxy group and the like, a hydroxydiorganosiloxy group ($R^1_2(HO)SiO_{1/2}$) such as hydroxydimethylsiloxy group and the like, or the like.

As described above, preferable organopolysiloxane of component (A) includes a straight chain organopolysiloxane consisting of the repeating structure of diorganopolysiloxane unit ($R^1_2SiO_{2/2}$) of the main chain wherein both ends of the molecular chain are blocked by a triorganosiloxy group ($R^1_3SiO_{1/2}$) or a hydroxydiorganosiloxy group ($R^1_2(HO)SiO_{1/2}$). Particularly preferable substituent in the molecule (that is, an unsubstituted or substituted monovalent hydrocarbon group bonded to a silicon atom) includes methylvinylpolysiloxane, methylphenylvinylpolysiloxane, methyltrifluoropropylvinylpolysiloxane and the like.

These organopolysiloxane can be obtained, for example, by (co)hydrolytic condensation of one or more organohalogenosilanes, or by ring opening polymerization of cyclic polysiloxane (trimer, tetramer, etc. of siloxane) using an alkaline or acidic catalyst.

Degree of polymerization of the organopolysiloxane is 100 or more (usually 100 to 100,000), preferably 1,000 to 100,000, more preferably 2,000 to 50,000, particularly preferably 3,000 to 20,000. The organopolysiloxane preferably does not have self-fluidity at room temperature (25° C.), and is so-called raw rubber like (non-liquid like). In the case that the degree of polymerization is too small, problems such as roll adhesion and the like occur, and roll workability is deteriorated, when formed into a compound. This degree of polymerization can be measured as a weight average degree of polymerization in terms of polystyrene by gel permeation chromatography (GPC) analysis.

The component (A) may be used alone, or a mixture containing two or three or more components (A) having different molecular weights (degree of polymerization) or molecular structure may be used.

A reinforcing silica of the component (B) is a filler added to obtain a silicone rubber composition having excellent mechanical strength. For this purpose, the specific surface area (BET adsorption method) is required to be 50 m$^2$/g or more, and is preferably 100 to 450 m$^2$/g, more preferably 100 to 300 m$^2$/g. When the specific surface area is less than 50 m$^2$/g, mechanical strength of the cured product is lowered.

Examples of such reinforcing silica include, for example, fumed silica, precipitated silica (wet silica) and the like. Silica obtained by hydrophobic treatment of the surface of these silica with chlorosilane, hexamethyldisilazane or the like are also preferable. Among these, fumed silica excellent in dynamic fatigue characteristics is preferable. One or two or more of the component (B) may be used in combination.

The amount of a reinforcing silica as the component (B) is 5 to 100 parts by mass, preferably 10 to 50 parts by mass, relative to 100 parts by mass of the organopolysiloxane of the component (A). When the amount of the component (B) is too small, reinforcing effect cannot be obtained. When it is too much, processability is deteriorated, and mechanical strength is lowered, and dynamic fatigue durability is also deteriorated.

Examples of alkoxysilanes of the component (C) represented by the formula (II) include an organoalkoxysilane such as organotrialkoxysilane, diorganodialkoxysilane, triorganoalkoxysilane and the like, and trialkoxysilane wherein m is 1 and $R^2$ is hydrogen atom, and tetraalkoxysilane wherein m is 0.

Here, $R^2$ is hydrogen atom or the same or different unsubstituted or substituted monovalent hydrocarbon group. The unsubstituted or substituted monovalent hydrocarbon groups may be the same as the groups of $R^1$ in the formula (I) of the component (A). Normally, a monovalent hydrocarbon group having 1 or 8 carbon atoms, particularly preferably 1 to 4 carbon atoms is preferable. Specific examples thereof include a alkyl group such as methyl group, ethyl group, propyl group, butyl group, hexyl group, octyl group or the like, a cycloalkyl group such as cyclopentyl group, cyclohexyl group or the like, an alkenyl group such as vinyl group, allyl group, propenyl group or the like, a cycloalkenyl group such as cyclohexenyl group or the like, an aryl group such as phenyl group, tolyl group or the like, an aralkyl group such as benzyl group, 2-phenylethyl group or the like, or these groups a part or all of the hydrogen atoms of which are substituted with a halogen atom such as fluorine, chlorine, bromine and the like or cyano group or the like, for example, chloromethyl group, 3,3,3-trifluoropropyl group, 2-cyanoethyl group or the like. Methyl group, vinyl group, phenyl group and trifluoropropyl group are preferable, and methyl group, vinyl group and phenyl group are particularly preferable. From the viewpoint of compatibility with the organopolysiloxane of the component (A), the unsubstituted or substituted monovalent hydrocarbon group is preferably the same as those of $R^1$ of the component (A).

An unsubstituted or substituted alkyl group of $R^3$ includes, for example, an alkyl group having usually 1 to about 4 carbon atoms such as methyl group, ethyl group, propyl group, isopropyl group, butyl group, isobutyl group, tert-butyl group and the like, and an alkoxy substituted alkyl group such as methoxymethyl group, methoxyethyl group, ethoxymethyl group, ethoxyethyl group and the like. From the viewpoint of hydrolyzability and the like, methyl group and ethyl group are preferable. In the formula, m is 0, 1, 2 or 3, and preferably 1 or 2.

Examples of such alkoxysilanes include dimethoxydimethylsilane, diethoxydimethylsilane, dimethoxydiethylsilane, diethoxydiethylsilane, dimethoxymethylvinylsilane, dimethoxydiphenylsilane, dimethoxymethylphenylsilane, trimethoxymethylsilane, triethoxymethylsilane, trimethoxyvinylsilane, trimethoxyphenylsilane, trimethoxysilane, triethoxysilane, tetramethoxysilane, tetraethoxysilane and the like. Diorganodialkoxysilanes wherein m is 2 such as dialkyldialkoxysilane are preferable, and dimethoxydimethylsilane is particularly preferable.

These alkoxysilanes are relatively inexpensive and it is economically extremely advantageous to use them as a starting material. These alkoxysilanes can be used alone or in combination of two or more. However, when a plurality of alkoxysilanes are mixed and used, attention must be given to a possibility of heterogeneous reaction, because hydrolysis rates of the mixed alkoxysilanes may be different.

The amount of the component (C) is 0.1 to 20 parts by mass, preferably 1 to 15 parts by mass, relative to 100 parts by mass of the component (A). When the amount of the alkoxysilane is too small, plasticity of the compound is too high, and plasticization return (creep hardening) is large. When the amount is too much, plasticity of the compound is too low, and roll adherence in kneading means such as roll mill and the like occurs and roll workability is deteriorated.

pH of water of the component (D) is not particularly limited, but the pH is preferably 1.0 to 12.0, more preferably 2.0 to 10.0, further preferably 2.0 to 7.0, because when the pH is too high or too low, the equipment used during compounding may be corroded. Here, in order to set the pH within the above range, as water of the component (D), an acidic aqueous solution prepared by using an inorganic acid such as hydrochloric acid, sulfuric acid, nitric acid or the like and an organic acid such as formic acid, acetic acid or the like, or a basic aqueous solution prepared by using sodium hydroxide, potassium hydroxide, aqueous ammonia or the like may be used.

The amount of water to be used is preferably 0.3 to 10 times by mol, more preferably 0.5 to 2.0 times by mol, particularly preferably 1.0 to 1.5 times by mol relative to the alkoxy group of the alkoxysilane. When the amount is less than the above range, a problem that the alkoxy group does not completely hydrolyze and only a small amount of hydroxyl group is formed, occurs. When too much amount is added, it is necessary to remove excess water.

In the formula (III) representing hexaorganodisilazane of the component (E), $R^4$ may be the same as the groups of $R^1$ in the component (A). Particularly, an alkyl group having 1 to about 6 carbon atoms such as methyl group, ethyl group and the like is preferable, and $R^4$ may contain an alkenyl group such as vinyl group and the like in the molecule.

Examples of the component (E) include hexamethyldisilazane, 1-vinylpentamethyldisilazane, 1,3-divinyl-1,1,3,3-tetramethyldisilazane, 1,3-dimethyl-1,1,3,3-tetravinyldisilazane and the like. Hexamethyldisilazane and 1,3-divinyl-1,1,3,3-tetramethyldisilazane are preferable, and hexamethyldisilazane is more preferable.

As the component (E), in addition to the above hexaorganodisilazane, aqueous ammonia may be used. The concentration of aqueous ammonia is not particularly limited, but aqueous ammonia of usually 1 to 30% by mass, preferably 10 to 28% by mass, more preferably about 15 to 28% by mass may be used.

In the case of hexaorganodisilazane, the amount of the component (E) is 0.01 to 1 parts by mass, preferably 0.02 to 1 parts by mass, more preferably 0.05 to 0.5 parts by mass relative to 100 parts by mass of the organopolysiloxane of the component (A). In the case of aqueous ammonia, the amount of the component (E) is 0.01 to 1 parts by mass, preferably 0.05 to 1 parts by mass, more preferably 0.1 to 1 parts by mass. When the amount of the component (E) is too small, effect of shortening the compounding time is small, and effect of improving permanent compression set and dynamic fatigue durability is not obtained. When the amount is too much, hardness of the obtained rubber is too high, and it is also not economically advantageous.

It is necessary to add the component (E) after the hydrolysis of an alkoxysilane of the component (C) with water of the component (D) is sufficiently performed. Specifically, it is necessary to add the component (E), after 25% by mass or more (25 to 100% by mass), preferably 50 to 100% by mass of the required amount of the component (B) is added to and uniformly mixed with the components (A), (C) and (D), during uniform mixing of every components in the step of preparation of the composition.

In the case that the component (E) is added at the time when the hydrolysis of an alkoxysilane of the component (C) with water of the component (D) is insufficient, the obtained composition has low resistance characteristics against plasticization return before curing and low resistance characteristics against permanent compression set after curing.

The millable silicone rubber in the present invention can be obtained by uniformly kneading and mixing predetermined amounts of the above components (A) to (E) at a predetermined mixing order or mixing period with a twin roll (roll mill), a kneader, a Banbury mixer or the like.

Namely, 25 to 100% by mass, preferably 50 to 100% by mass of the required amount of the component (B) is mixed with the components (A), (C) and (D). In this mixing, the hydrolysis reaction of an alkoxysilane of the component (C) with water of the component (D) proceeds, and the hydrolysis reaction product acts as a wetter of the silica of the component (B), so that the mixing time is shortened. In this case, conditions of the mixing and kneading are desirably preferably at 0 to 100° C., more preferably 10 to 90° C., further preferably 30 to 80° C., and preferably for 1 to 120 minutes, more preferably 10 to 60 minutes, in order to achieve the hydrolysis reaction by the component (D) sufficiently.

Next, after in this way the hydrolysis reaction of the components (C) and (D) has sufficiently proceeded, a hexaorganodisilazane or ammonia water of the component (E) is added. This further shortens the mixing time. In the case that the total amount of silica of the component (B) has not been used in the previous mixing and kneading step, the remaining amount of the silica of the component (B) is added at this mixing and kneading step. The temperature in the case of adding, mixing and kneading the components (E) and the remaining amount of the component (B) is preferably 0 to 100° C., particularly 10 to 90° C., particularly preferably 40 to 80° C. The mixing and kneading time is preferably 1 to 120 minutes, particularly 3 to 60 minutes.

The total compounding time of the components (A) to (E) is preferably 5 minutes to 5 hours, more preferably 10 minutes to 3 hours.

In addition to the above mentioned ones, KE-571-U, KE-1571-U, KE-951-U, KE-541-U, KE-551-U, KE-561-U, KE-961T-U, KE-1541-U, KE-1551-U, KE-941-U, KE-971T-U (Shin-Etsu Chemical Co., Ltd.) may be used as a millable silicone rubber in the present invention.

Unexpanded microballoons in the present invention may be unexpanded resin microballoons.

As the resin microballoons, one using a thermoplastic resin in the outer shell may be preferably used. Examples of the thermoplastic resin constituting the outer shell include vinylidene chloride/acrylonitrile copolymer, methyl methacrylate/acrylonitrile copolymer, methacrylonitrile/acrylonitrile copolymer, and the like. It is preferable to use resin microballoons in which a softening temperature of the resin to be the outer shell is within an appropriate range in accordance with the curing temperature of the liquid silicone rubber. Further, examples of an evaporable substance included therein, include hydrocarbons such as butane, isobutane and the like.

Unexpanded resin microballoons suitable for the present invention are commercially available as "Matsumoto Microsphere-F Series" (Matsumoto Yushi-Seiyaku Co., Ltd.), "Expancel Series" (Expancel, Inc.), and the like.

As the chemical blowing agent in the present invention, any blowing agent conventionally used for forming the elastic layer may be used. For example, inorganic blowing agents include sodium bicarbonate, ammonium carbonate and the like, and organic blowing agents include a diazoamino derivative, an azonitrile derivative, and an azodicarboxylic acid derivative, and the like. Among the organic azo compounds, azodicarboxylic acid amide, azobis-isobutyronitrile and the like are suitably used. In particular, azobis-isobutyronitrile can be suitably used.

The sponge roller of the present invention has an elastic layer formed of the millable silicone rubber, unexpanded microballoons and chemical blowing agent. The cell area ratio of the unexpanded microballoon cells and the chemical blowing agent cells on the cross section of the elastic layer appearing when cutting the elastic layer in the direction perpendicular to the central axis of this elastic layer is 95:5 to 50:50, preferably 90:10 to 55:45. When the cell area ratio is within the above range, the cell diameter of the chemical blowing agent does not become excessively large under the influence of the unexpanded microballoons, and an elastic layer having excellent surface smoothness can be obtained. Furthermore, this elastic layer has composite cells formed of the unexpanded microballoon cells having an average cell diameter of 150 μm or less, preferably 150 to 20 μm, particularly preferably 120 to 30 μm, and the chemical blowing agent cells having an average cell diameter of 300 μm or less, preferably 300 to 50 μm, particularly preferably 250 to 60 μm. In the present invention, the average cell diameter of the chemical foaming agent cells is larger than the average cell diameter of the unexpanded microballoon cells. Small diameter cells of the unexpanded microballoons have small hardness decrease by repeated compression, but have large permanent compression set. On the other hand, the large diameter cells of the chemical blowing agent has small permanent compression set, but large hardness decrease by repeated compression. By adjusting the mixing ratio of the unexpanded microballoons and the chemical blowing agent to optimize the cell area ratio, it is possible to reduce both of hardness decrease by repeated compression and permanent compression set.

The cell area ratio is a ratio of the total area of the microballoon cells and the total area of the chemical blowing agent cells, which are observed by magnifying 200 times by an optical microscope the outer surface of the elastic layer or a cross section of the elastic layer cut at an arbitrary direction. The average cell diameter is the average value of ten randomly selected cells, which are observed by magnifying 100 or 200 times by an optical microscope the outer surface of the elastic layer or a cross section of the elastic layer cut at an arbitrary direction. Identification of cells by unexpanded microballoons may be determined by microballoon shells or debris of contracted shells within the cells. This average cell diameter can be adjusted by appropriately setting the vulcanization conditions of the mixture containing the millable silicone rubber, the unexpanded microballoons and the chemical blowing agent for forming the elastic layer.

By including a chemical blowing agent in the mixture, the elastic layer has cells produced by the chemical blowing agent. In the case that the mixture does not contain unexpanded microballoons, the cell diameter is large in the obtained elastic layer not having unexpanded microballoon cells, and surface smoothness is deteriorated. The elastic layer in the sponge roller of the present invention suppresses cells derived from the chemical blowing agent from becoming larger by cells derived from the unexpanded microballoons, and thereby improving surface smoothness of the sponge roller.

Also, it is preferable to adjust the amount of the unexpanded microballoons and the amount of the chemical blowing agent to the amounts as described in explanation of the above manufacturing method.

A permanent compression set may be evaluated in the following manner.

<Evaluation Method of 25% Permanent Compression Set>

Figure 2:
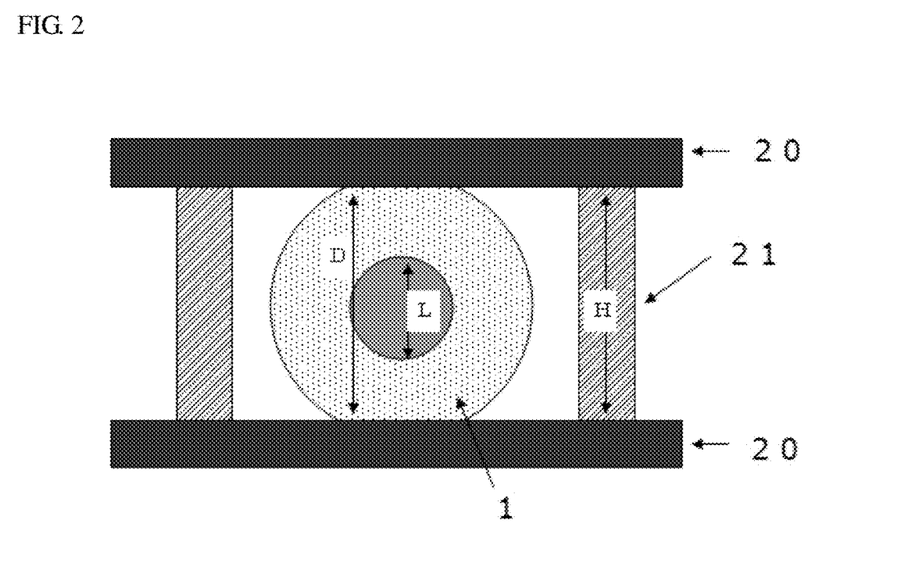
FIG. 2 is a schematic drawing showing a measurement apparatus for measuring a permanent compression set of a sponge roller according to the present invention.

As shown in FIG. 2, the upper and lower sides of the sponge roller 1 are sandwiched between iron plates 20 and fixed with a vice. At that time, the spacers 21 are sandwiched between the upper and lower iron plates 20, and are adjusted so that the distance between the iron plates is kept constant. The sponge roller 1 is kept in this state in a dryer at 180° C. for 5 hours. After that, the iron plates sandwiching the sponge roller 1 are removed, and the sponge roller 1 is kept at room temperature for 16 hours. The diameter of the sponge roller 1 is measured, and a permanent compression set is calculated by the following equation.

$$\text{Permanent compression set (\%)} = (D1-D2)/(D1-H) \times 100$$

$$\text{Compressibility (\%)} = (D1-H)/(D1-L) \times 100$$

wherein a diameter of the sponge roller 1 before the test D1
a diameter of the sponge roller 1 after the test D2
a diameter of the core metal L
a height of the spacer 21 H The hardness decrease can be measured by 25% compression durability test method. The hardness decrease of the elastic layer of the present invention measured by 25% compression durability test method is preferably 15% or less, particularly 15 to 3%. When the hardness decrease is within the above numerical range, the image forming apparatus using the obtained sponge roller is preferable because stable image formation is enabled over a long period of time.

Also, the elastic layer preferably has an Asker C hardness of 20 to 60. In the sponge roller of the present invention, difference of the Asker C hardness between both ends of the surface of the elastic layer in the axial direction is 1 or less. The small difference of Asker C hardness of the elastic layer in the sponge roller is favorable because advantageously the pressurized elastic layer is uniformly deformed and deviation of the stress distribution is small.

The elastic layer is formed in cylindrical shape on the outer peripheral surface of the shaft body, and thickness of the elastic layer is usually 0.5 to 30 mm, preferably 1 to 15 mm As long as the object of the present invention can be achieved, the elastic layer may contain a low molecular weight siloxane ester, a silanol, a dispersing agent such as diphenylsilanediol and the like, a heat resistance improving agent such as iron oxide, cerium oxide, iron octylate and the like, various carbon functional silanes for improving adhesiveness and molding processability, halogen compounds for imparting flame retardancy, or the like within the range not to impair the object of the present invention.

The sponge roller of the present invention may be produced as follows.

First, a millable silicone rubber, 0.5 to 3.0 parts by mass of unexpanded microballoons relative to 100 parts by mass of the millable silicone rubber, 0.05 to 1.0 parts by mass of a chemical blowing agent relative to 100 parts by mass of the millable silicone rubber, and a crosslinking agent are compounded.

The types and the like of the unexpanded microballoons and the chemical blowing agent have already been explained. Examples of the crosslinking agent include an addition reaction crosslinking agent, an organic peroxide crosslinking agent and the like.

Suitable examples of the addition reaction crosslinking agent include, for example, an organohydrogenpolysiloxane known as an addition reaction crosslinking agent having two or more SiH groups (SiH bonds) in one molecule. The addition reaction crosslinking agent can be used alone or in combination of two or more. The amount of the addition reaction crosslinking agent is usually 0.1 to 3.0 parts by mass relative to 100 parts by mass of the millable silicone rubber.

The organic peroxide crosslinking agent can crosslink the millable silicone rubber alone. However, in the case of using this addition reaction crosslinking agent and using the organic peroxide crosslinking agent as an auxiliary crosslinking agent of the addition reaction crosslinking agent, the characteristics such as strength, distortion and the like of the obtained sponge roller further improve. Examples of the organic peroxide crosslinking agent include benzoyl peroxide, bis-2,4-dichlorobenzoyl peroxide, dicumyl peroxide, di-t-butyl peroxide, 2,5-dimethyl-2,5-bis(t-butylperoxy) hexane and the like. The amount of the organic peroxide crosslinking agent is usually 0.1 to 5.0 parts by mass relative to 100 parts by mass of the millable silicone rubber. The organic peroxide crosslinking agent can be used alone or in combination of two or more.

The addition reaction crosslinking agent is preferably used in combination with an addition reaction catalyst. The addition reaction catalyst includes platinum black, platinic chloride, chloroplatinic acid, a reaction product of chloroplatinic acid and a monohydric alcohol, a complex of chloroplatinic acid and an olefin, platinum bisacetoacetate, a palladium catalyst, a rhodium catalyst, and the like. Incidentally, the amount of this addition reaction catalyst may be a catalytic amount.

The mixing method is not particular restricted. The mixing method includes, for example, a method that to the millable silicone rubber is added unexpanded microballoons, a chemical blowing agent, and a crosslinking agent one after another or all at once at normal temperature under normal pressure, and is uniformly stirred in a stirrer, kneader or the like, and the like. In this way, the step of preparing the mixture is completed.

The mixture may contain various additives. Various additives include, for example, an auxiliary agent for a chain extender, a crosslinking agent or the like, a catalyst, a dispersing agent, a blowing agent, an antiaging agent, an antioxidant, a filler, a pigment, a colorant, a processing aid, a softening agent, a plasticizer, an emulsifier, a heat resistance improver, a flame retardancy improver, an acid acceptor, a thermal conductivity improver, a release agent, a solvent and the like. These various additives may be commonly used additives or additives specially used depending on the application.

The mixture can be obtained by kneading using a rubber kneading machine such as a twin roll, triple roll, roll mill, Banbury mixer, dough mixer (kneader) and the like until uniformly mixed, for example, at room temperature or under heating for several minutes to several hours, preferably for 5 minutes to 1 hour.

Next, the obtained mixture is heated and molded on the outer peripheral surface of the shaft body constituting the sponge roller by continuous heating molding by extrusion molding, or molding by press, injection or the like.

After forming the mixture in cylindrical shape on the outer peripheral surface of the shaft body, the cylindrical mixture, in other words, the cylindrical molded body is heated together with the shaft body and vulcanized. The average cell diameter of the large diameter cells after foaming and the average cell diameter of the small diameter cells after foaming can be adjusted within a predetermined range by the conditions of the heating and vulcanization, for example, the type and amount of unexpanded microballoons and a chemical blowing agent, the type and amount of the crosslinking agent, heating temperature and the like.

It is particularly preferable that heating at the time of heating and vulcanizing the molded body is performed as follows. Namely, as primary vulcanization, heating is performed at 100 to 300° C., particularly 150 to 250° C. for 5 to 30 minutes, then as secondary vulcanization, heating is preferably performed at 180 to 250° C., particularly at 200 to 230° C. for 1 to 10 hours. When heating is performed in a plurality of times in this manner, expansion of the unexpanded microballoons, decomposition of the chemical blowing agent, curing of the millable silicone rubber, removal of remaining low molecular weight siloxane, and thermal contraction of the expanded microballoons can be controlled as required, which is preferable. By performing a plurality of heating operations in this manner, composite cells comprising small cells derived from the unexpanded microballoons having an average cell diameter of 150 μm or less and large cells derived from the chemical blowing agent having an average cell diameter of 300 μm or less, can be obtained. Incidentally, the average cell diameter of the large diameter cells will not be smaller than the average cell diameter of the small diameter cells.

Heating necessary for vulcanization can be carried out by a heating oven such as an infrared heating oven or a hot air oven and the like, a heating oven such as a drying machine or the like.

The obtained sponge roller may be further subjected to a polishing step. The polishing step is a step of adjusting the shape of the sponge roller formed on the outer peripheral surface of the shaft body to a shape of gradually increasing thickness of the sponge roller in the axial direction of the shaft body toward the center of the shaft body and gradually decreasing thickness of the sponge roller from the center of the shaft body toward the tip, namely, a crown shape; or to a shape of increasing thickness of the sponge roller from the center of the shaft body toward both ends of the shaft body, namely, an inverted crown shape; or to a straight shape.

Further, the outer surface of the sponge roller obtained by the vulcanization or the sponge roller adjusted to a predetermined shape by the polishing step may be covered with a tube, for example, a fluororesin tube. Covering with a fluororesin tube may be performed, for example, by a pressure insertion method in which the sponge roller is pressed under pressure and inserted into the fluororesin tube; a decompression insertion method in which the fluororesin tube is compressed under reduced pressure and the sponge roller is inserted into the fluororesin tube; or a decompression diameter expansion method in which the fluororesin tube is expanded in the radial direction under reduced pressure and the sponge roller is inserted into the inside thereof; or the like.

The sponge roller of the present invention may be incorporated in, for example, a fixing device of an image forming apparatus.

Next, an embodiment of an image forming apparatus in which a sponge roller of the present invention (hereinafter referred to as an image forming apparatus of the present invention) is incorporated in a fixing device, is explained with reference to FIG. 3.

Figure 3:
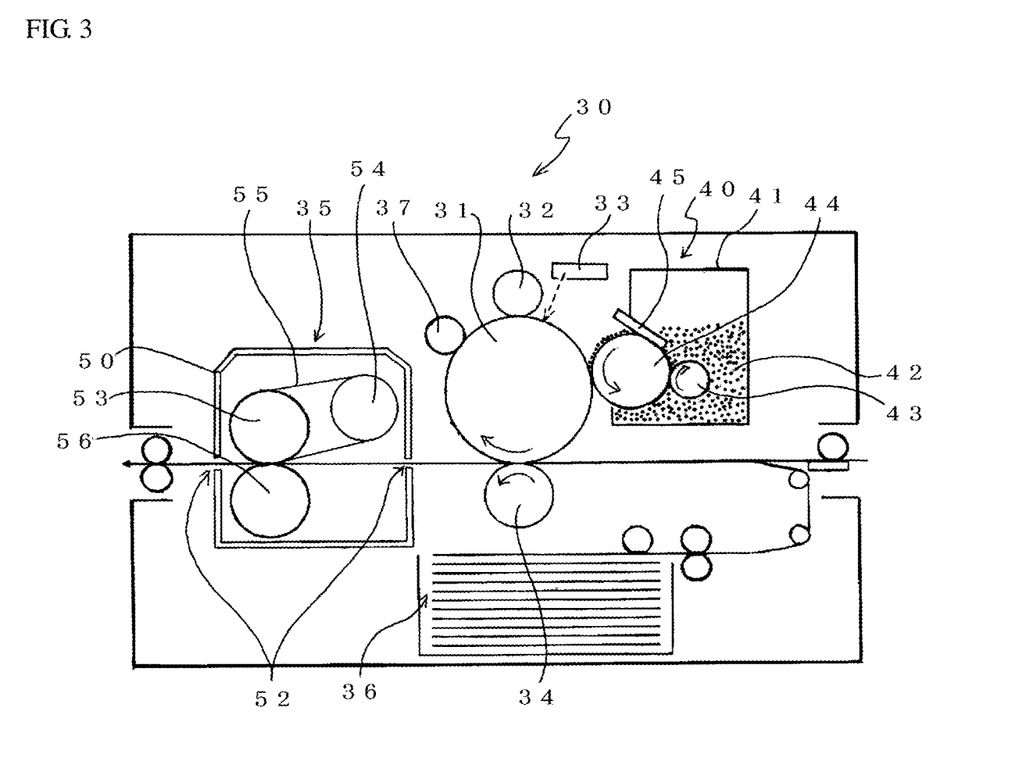
FIG. 3 is an explanatory drawing showing an embodiment of an image forming apparatus in which a sponge roller according to an embodiment of the present invention is incorporated in a fixing device.

As shown in FIG. 3, the image forming apparatus 30 of the present invention comprises a rotatable image carrier 31 on which an electrostatic latent image is formed, for example, a photoreceptor; a charging means 32 disposed around the image carrier 31, for example, a charging roller; an exposure means 33; a developing means 40; a transfer means 34 such as a transfer roller; and a cleaning means 37; and a fixing device 35 on the downstream side in the transport direction of the recording body. The developing means 40 is formed basically in the same manner as the conventional developing means, and specifically, as shown in FIG. 3, the developing means 40 comprises a developer containing portion 41; a developer carrying member 44 for supplying the developer 42 to the image carrier 31; a developer supply means 43 for supplying the developer 42 to the developer carrying member 44; and a developer regulating member 45 for charging the developer 42.

In a conventional fixing device in an image forming apparatus, a nip width and nip pressure are secured usually by making hardness of a fixing roller low and making hardness of a pressure roller high. However, the fixing device in the present invention is, as with the fixing device 35, a heat fixing device comprising a low hardness fixing roller 53 in the range of 20 to 35 of Asker C hardness (load 1.0 kg) and a low hardness pressure roller 56. Namely, as its cross section is shown in FIG. 3, the fixing device 35 is a pressure heat fixing device comprising, in the housing 50 having the opening 52 passing the recording body 36, the fixing roller 53; the endless belt supporting roller 54 disposed in the vicinity of the fixing roller 53; the endless belt 55 wound around the fixing roller 53 and the endless belt supporting roller 54; the pressure roller 56 pressed against the fixing roller 53 via the endless belt 55; the heating means 57 for heating the fixing roller 53 from the outside via the endless belt 55, which is disposed so as not to contact with the endless belt 55; and wherein the fixing roller 53 and the pressure roller 56 are rotatably supported so that both rollers are brought into contact with or pressed against each other via the endless belt 55.

The endless belt supporting roller 54 may be any roller generally used in an image forming apparatus, and for example, an elastic roller or the like is used. The endless belt 55 may be any endless type belt formed of a resin such as polyamide, polyamideimide and the like, and its thickness or the like may be appropriately adjusted so as to be suitable for the fixing device 35. The pressure roller 56 is pressed against the fixing roller 53 via the endless belt 55 by a biasing means such as a spring (not shown). The sponge roller of the present invention is mounted as the pressure roller 56 in this fixing device 35. As the heating means 57, a radiation heating method using a halogen heater and a reflecting plate or the like; a direct contact heating method in which a heater or the like is directly brought into contact and heated; an induction heating method; or the like may be adopted. This heating means 57 is a member having substantially the same length as the length in the axial direction of the fixing roller 53 and may be disposed anywhere in the fixing devices 35. However, as shown in FIG. 3, the heating means 57 is preferably disposed substantially in parallel with the fixing roller 53 at a certain interval from the surface of the fixing roller 53. For the induction heating method, a heating coil is used, and this heating coil is usually a ferromagnetic material such as ferrite and the like, and is formed in a typical shape used for a switching power supply such as I type, E type, U type and the like, and is formed by winding a conductive wire. As the recording body 36 passes between the pressed contact of the endless belt 55 and the pressure roller 56, the recording body 36 can be pressurized and heated at the same time to fix the developer 42 (electrostatic latent image) transferred to the recording body 36.

The image forming apparatus 30 of the present invention operates as follows. First, in the image forming apparatus 30, the image carrier 31 is uniformly charged by the charging means 32, and an electrostatic latent image is formed on the surface of the image carrier 31 by the exposing means 33. Next, the developer 42 is supplied from the developing means 40 to the image carrier 31 to develop the electrostatic latent image, and this developer image is transferred onto the recording body 36 to be conveyed between the image carrier 31 and the transfer means 34. The recording body 36 is conveyed to the fixing device 35, and the developer image is fixed on the recording body 36 as a permanent image. In this manner, an image can be formed on the recording body 36.

Since the fixing device 35 and the image forming apparatus 30 employ the sponge roller of the present invention as the pressure roller 56, fixability for fixing the developer on the recording body is excellent, and power consumption is low.

The sponge roller and image forming apparatus of the present invention are not limited to the above embodiments, and various modifications are possible within the scope that the object of the present invention can be achieved.

For example, in the sponge roller 1, the elastic layer 3 has a single layer structure, but it may have a multi-layer structure of two or more layers in the present invention.

The image forming apparatus 30 is an electrophotographic type image forming apparatus, but in the present invention, the image forming apparatus is not limited to the electrophotographic type, and may be, for example, an electrostatic type image forming apparatus. In addition, the image forming apparatus 30 is a monochrome image forming apparatus containing only the monochromatic developer 42 in the developing means 40, but in the present invention, the image forming apparatus is not limited to the monochrome image forming apparatus, and may be a color image forming apparatus. A color image forming apparatus includes, for example, a four cycle type color image forming apparatus which sequentially repeats primary transfer of a developer image carried on an image carrier to an intermediate transfer body; a tandem type color image forming apparatus in which a plurality of image carriers are disposed in series on an intermediate transfer member or a transfer conveyance belt; and the like. The image forming apparatus 30 is, for example, an image forming apparatus such as a copying machine, a facsimile machine, a printer, or the like.

Further, in the fixing device 35 and the image forming apparatus 30, a one component type developer is advantageously used as the developer 42, but a two component type developer including a toner and a carrier such as iron, nickel or the like may be also used.

EXAMPLE

Examples 1 to 7 and Comparative Examples 1 to 4

In Examples 1 to 7 and Comparative Examples 1 to 4, the base rubber materials shown in Table 1, the crosslinking agents shown in Table 1, the unexpanded microballoons shown in Table 1 and the chemical blowing agent shown in Table 1 were thoroughly kneaded in the compounding amount shown in Table 1 using a twin roll to obtain mixtures.

The base rubber materials used in Examples 1 to 7 and Comparative Examples 1 to 4 were millable silicone rubbers (Product name KE-551U, Shin-Etsu Chemical Co., Ltd.). The crosslinking agent described in Table 1 is a combination of "Addition crosslinking agent" (Product name C-25B, Shin-Etsu Chemical Co., Ltd.) and "Peroxide crosslink agent" (Product name C-3, Shin-Etsu Chemical Co., Ltd.). "Catalyst" described in Table 1 is a platinum catalyst (Product name C-25A, Shin-Etsu Chemical Co., Ltd.). "Chemical blowing agent" described in Table 1 is AIBN of Product name AZO series (Otsuka Chemical Co., Ltd.). The unexpanded microballoons described in Table 1 are Product name Matsumoto microspheres (Matsumoto Yushi-Seiyaku Co., Ltd.).

In Comparative Example 1, no chemical blowing agent was compounded, and only unexpanded microballoons were used. In Comparative Example 4, no unexpanded microballoons were compounded and only the chemical blowing agent was used.

Subsequently, the shaft body on which the primer layer was formed, and the above mixture were extruded integrally by an extrusion molding machine. In Examples 1 to 7 and Comparative Examples 1 to 4, primary vulcanization was executed by heating the mixture at 225° C. for 17 minutes using an infrared heating oven (IR oven). Then, by secondary vulcanization at 225° C. for 7 hours in a hot air drying oven, a raw foam roller was prepared. The outer peripheral surface of this raw foam roller was polished with high speed using metal whetstones by a polishing machine (Minakuchi Machinery Works Ltd.).

The sponge rollers obtained in Examples 1 to 7 and Comparative Examples 1 to 4 had a straight shape with an outer diameter of 30 mm and an axial length of 340 mm Average cell diameters, sponge specific gravities, and hardness (Asker C hardness) of the surface side and the shaft side of the elastic layer after polishing were measured, and the results are shown in Table 1.

Further, durability of the sponge roller was measured and evaluated by the evaluation method of 25% permanent compression set explained above, and the following durability test.

(Durability Test)

Figure 4:
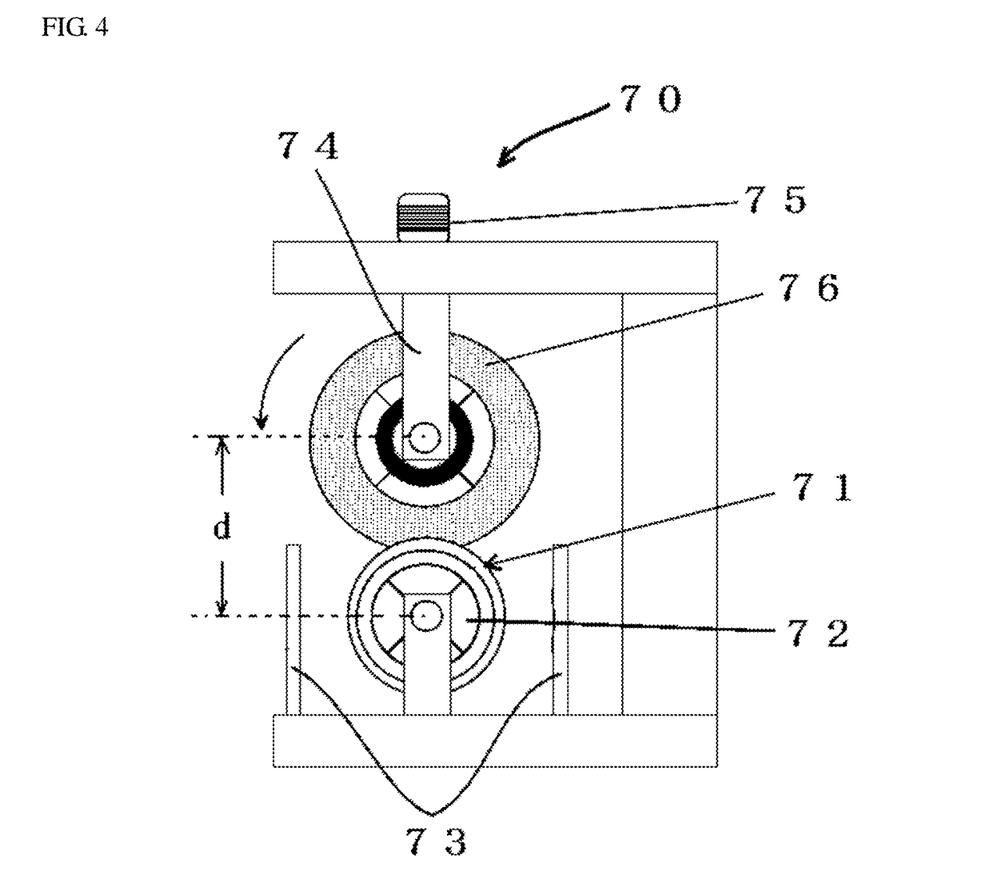
FIG. 4 is a schematic drawing showing a durability test apparatus suitably used for executing a durability test of an elastic roller in the embodiment.

State of hardness decrease was evaluated by executing a durability test of each sponge roller using the sponge roller produced in this way and the durability test apparatus 70 shown in FIG. 4. Specifically, the durability test apparatus 70 comprises a heating roller 71 fixed to the lower surface inside the housing and comprising an internal heater 72; heat insulating materials 73 provided on both sides of the heating roller 71 in its axial direction; a test roller mounting portion 74 vertically movable provided on the upper surface of the inside of the housing opposite to the heating roller 71; and a pressing force adjusting means 75 such as a micrometer for pressure adjustment which makes the test roller mounting portion 74 vertically movable. As the heating roller 71, a roller made of metal (stainless steel, SUS 304) having a diameter of 20 mm was used.

Each produced sponge roller was mounted on the bearing of the test roller mounting portion 74, and as shown in FIG. 3, the pressing force adjusting means 75 was operated to make the mounted elastic roller ("elastic roller 76" in FIG. 4) be crimped to the heating roller 71, and the elastic roller 76 was fixed so that the foamed elastic layer of the elastic roller 76 was dented inside by 2 mm at the pressure welding part between the heating roller 71 and the elastic roller 76. Namely, the distance d between the central axis of the elastic roller 76 and the central axis of the heating roller 71 was adjusted so that the distance d was 2 mm shorter than the sum of the radius of the elastic roller 76 and the radius of the heating roller 71. Next, the internal heater 72 was activated, and the surface temperature of the heating roller 71 was adjusted to 180° C. Thereafter, by driving means (not shown in FIG. 3) provided in the test roller mounting portion 74, the elastic roller 76 was rotated at a rotation speed of 180 rpm for 100 hours. The elastic roller 76 was detached from the durability test apparatus 70 and the Asker C hardness was measured. Measurement points of Asker C hardness were three points in the axial direction and four points in the circumferential direction. Specifically, three points in the axial direction were the points 30 mm away from either end portion of the foamed elastic body toward the center and the central point in the axis direction. The four points in the circumferential direction were four positions equally spaced in the circumferential direction at a central angle of 90° from each of the above three positions in the axial direction. As a result of this durability test, when the hardness decrease amount is 15% or less, it is assumed to be OK. The durability test results are shown in Table 1 in the item "Hardness change after 25% compression durability test (%)".

TABLE 1

| | | Comparative Example | | Example | | | | | | | Comparative Example | |
|---|---|---|---|---|---|---|---|---|---|---|---|---|
| | | 1 | 2 | 1 | 2 | 3 | 4 | 5 | 6 | 7 | 3 | 4 |
| Formulation | Base rubber material (Parts by weight) | Millable silicone rubber 100 | | | | | | | | | | |
| | Cross linking agent (Parts by weight) | Addition crosslinking agent C-25B 2 and peroxide crosslinking agent 3 | | | | | | | | | | |
| | Catalyst (Parts by weight) | Platinum catalyst C-25A 1.5 | | | | | | | | | | |
| | Unexpanded microballoon (Parts by weight) | 3.2 | 2.5 | 2.8 | 0.5 | 2 | 1.6 | 1 | 1.5 | 0.8 | 0.5 | 0 |
| | Chemical blowing agent AIBN (Parts by weight) | 0 | 0.05 | 0.07 | 0.05 | 0.2 | 0.4 | 0.5 | 1 | 0.8 | 0.7 | 0.8 |
| Production method | Molding | Extrusion molding | | | | | | | | | | |
| | Thermal curing | First vulcanization, IR oven (225° C., 17 min.) and second vulcanization, hot air oven (225° C., 7 hours) | | | | | | | | | | |
| | Polishing | High speed polishing with metal whetstones | | | | | | | | | | |

TABLE 1-continued

|  |  | Comparative Example | | Example | | | | | | | Comparative Example | |
|---|---|---|---|---|---|---|---|---|---|---|---|---|
|  |  | 1 | 2 | 1 | 2 | 3 | 4 | 5 | 6 | 7 | 3 | 4 |
| Evaluation | Cell area ratio of microballoon and chemical blowing agent | only microballoon | 99:1 | 95:5 | 87:13 | 89:11 | 81:19 | 69:31 | 55:45 | 51:49 | 41:59 | ony chemical blowing agent |
|  | Average cell diameter (μm)*1 | 41/ | 38/62 | 40/65 | 39/73 | 50/85 | 55/88 | 65/155 | 120/300 | 85/220 | 150/415 | /425 |
|  | Sponge hardness (Ascar C) | 34 | 35 | 33 | 59 | 34.5 | 32 | 34 | 19 | 27 | 26 | 30 |
|  | Sponge specific gravity | 0.53 | 0.60 | 0.57 | 0.90 | 0.59 | 0.55 | 0.58 | 0.32 | 0.46 | 0.44 | 0.46 |
|  | Hardness change after 25% compression durability test (%) | −7.9 | −8 | −8 | −8 | −7.6 | −9.5 | −8.5 | −10 | −12.8 | −16 NG | −18.3 NG |
|  | 25% Permanent compression set (%) | 23.2 NG | 15.8 NG | 12.3 | 7.1 | 9.1 | 8.3 | 6.4 | 10.9 | 5 | 4.2 | 3.6 |

Regarding the Durability Rest:

Outer diameter of the product φ30 mm, outer diameter of the shaft φ14 mm, wall thickness 8 mm 25% of compression ratio means compression by 2 mm

*1 The number on the left side of "/" is the average cell diameter of the unexpanded microballoon cells, and the number on the right of "/" is the average cell diameter of the chemical blowing agent cells.

REFERENCE SIGNS LIST 1 sponge roller
2 shaft body
3 elastic layer
4 fluororesin layer
20 iron plate
21 spacer
30 image forming apparatus
31 image carrier
32 charging means
33 exposure means
34 transfer means
35 fixing device
36 recording body
37 cleaning means
40 developing means
41 developer containing portion
42 developer
43 developer supply means
44 developer carrying member
45 developer regulating member
50 housing
52 opening
53 fixing roller
54 endless belt supporting roller
55 endless belt
56 pressure roller
70 durability testing apparatus
71 heating roller
72 internal heater
73 heat insulation material
74 test roller mounting portion
75 pressing force adjusting means
76 elastic roller

The invention claimed is:

1. A sponge roller comprising a shaft body and an elastic layer formed on an outer peripheral surface of the shaft body,
    wherein the elastic layer is formed of a millable silicone rubber, unexpanded microballoon cells and chemical blowing agent cells,
    a cell area ratio of the unexpanded microballoon cells and the chemical blowing agent cells on a cross section of the elastic layer is 95:5 to 50:50,
    the elastic layer comprises 0.5 to 3.0 parts by mass of the unexpanded microballoon cells relative to 100 parts by mass of the millable silicone rubber, and 0.05 to 1.0 parts by mass of a chemical blowing agent relative to 100 parts by mass of the millable silicone rubber, and
    an evaporable substance is included in the unexpanded microballoon cells.

2. The sponge roller according to claim 1, wherein a specific gravity of the elastic layer is 0.9 to 0.3.

3. The sponge roller according to claim 1, wherein the elastic layer has composite cells formed of the unexpanded microballoon cells having an average cell diameter of 150 μm or less and the chemical blowing agent cells having an average cell diameter of 300 μm or less.

4. The sponge roller according to claim 1, wherein 25% permanent compression set of the elastic layer is 15% or less, and a hardness decrease in 25% compression durability test of the elastic layer is 15% or less.

5. The sponge roller according to claim 1, wherein the evaporable substance is a hydrocarbon.

6. An image forming apparatus comprising the sponge roller according to claim 1.

* * * * *